United States Patent [19]

Sturgill

[11] 4,058,943
[45] Nov. 22, 1977

[54] GLASS BLOCK PANEL

[76] Inventor: Lawrence W. Sturgill, Rte. No. 1, Box 111A, Schererville, Ind.

[21] Appl. No.: 692,324

[22] Filed: June 3, 1976

[51] Int. Cl.² .............................................. B32B 1/04
[52] U.S. Cl. ...................................... 52/227; 52/307; 52/309.4; 52/477; 428/162; 428/166; 428/45; 428/53
[58] Field of Search ................. 52/306, 307, 308, 477, 52/227; 428/34, 38, 49, 53, 119, 120, 133, 163, 167, 13, 162, 166

[56] References Cited

U.S. PATENT DOCUMENTS

| 2,156,623 | 5/1939 | Eastus | 52/308 |
|---|---|---|---|
| 2,303,844 | 12/1942 | Knudsen | 52/308 |
| 2,318,362 | 5/1943 | Boeglen et al. | 52/308 |
| 3,234,699 | 2/1966 | Smith | 428/167 X |
| 3,531,346 | 9/1970 | Jameson | 428/34 X |
| 3,630,814 | 12/1971 | Arnold | 428/34 |

FOREIGN PATENT DOCUMENTS

| 1,148,528 | 4/1969 | United Kingdom | 428/167 |

Primary Examiner—George F. Lesmes
Assistant Examiner—Henry F. Epstein
Attorney, Agent, or Firm—Walter Leuca

[57] ABSTRACT

As an article of manufacture, a glass block panel comprising a plurality of glass blocks having a circumferential rib around the edges thereof. The glass blocks are uniformly spaced apart edge to edge in a width and breadth direction by longitudinal spacer members. The spacer members are provided with grooves for receiving therein the circumferential rib of the glass blocks. The spacer members are laterally slotted to the center from one side thereof and are interconnected to form a reticular framework between the glass blocks. The reticular framework provides a mortar space between the glass blocks at the faces thereof in which are fitted spacer bars longitudinally abutting against the edges of the spacer members. Further provided in the spaces between the glass blocks is caulking material to form the mortar like joints between the glass blocks of the panel. Banding means are tightened circumferentially around the edges of the glass blocks to secure the panel as an article of manufacture.

6 Claims, 5 Drawing Figures

GLASS BLOCK PANEL

BACKGROUND OF THE INVENTION

1. Field of the Invention

This invention relates generally to wall panels and more particularly to a glass block panel as an article of manufacture.

SUMMARY OF THE INVENTION

The advantages over the prior art that my invention is directed is the provision of a glass block panel article of manufacture which is easy and economical to manufacture, readily lends itself to mass production, and glass block panels assembled according to my invention are rigid and may be transported and handled without distortion in shape.

Other objects and advantages of my invention will become more apparent after a careful study of the following detailed description taken together with the accompanying drawings which illustrate a preferred embodiment of my invention.

DESCRIPTION OF THE PREFERRED EMBODIMENT

Figure 1:
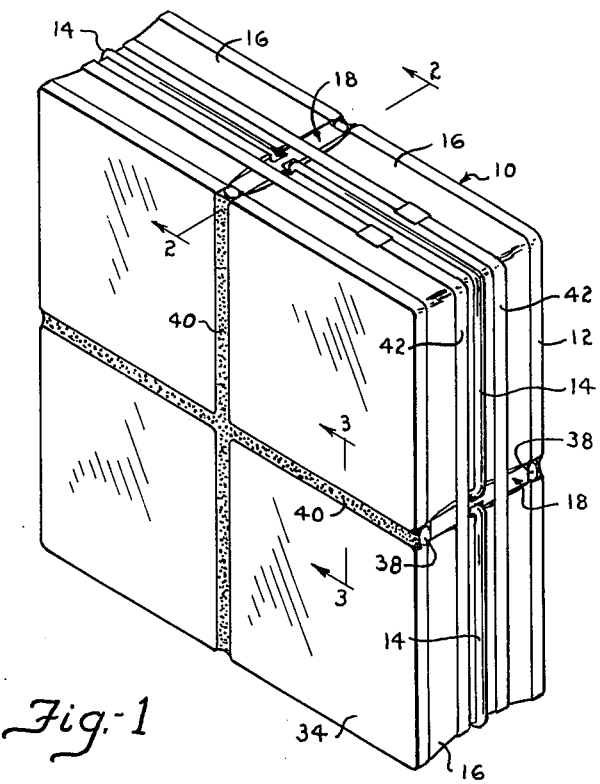
FIG. 1 is a perspective front view of a glass block panel structured according to my invention.
Figure 2:
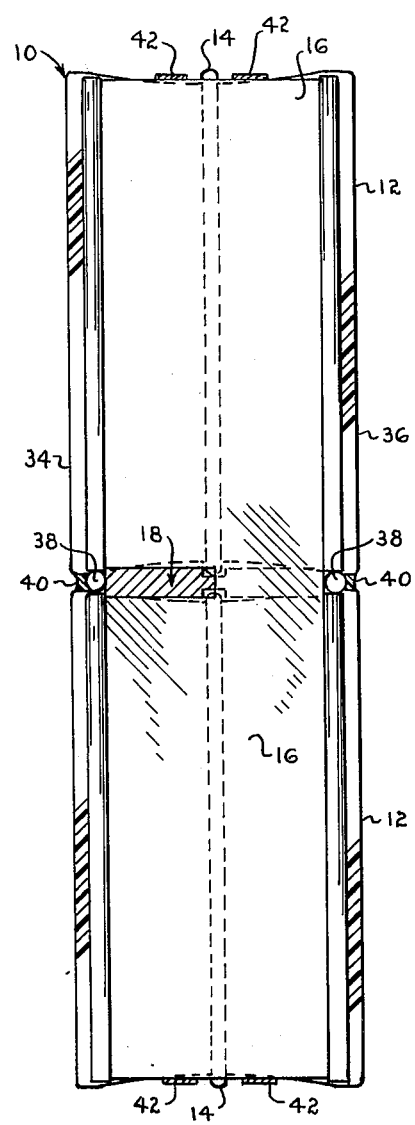
FIG. 2 is a longitudinal section of the glass block panel taken along lines 2—2 of FIG. 1.
Figure 3:
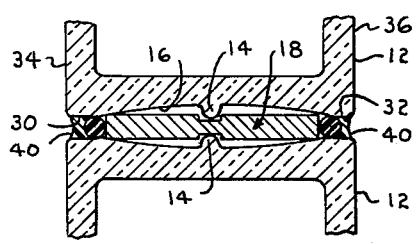
FIG. 3 is a fragmentary cross section of the panel of my invention taken along lines 3—3 of FIG. 1.
Figure 5:
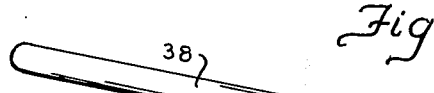
FIG. 5 is a pictorial view of the spacer rod member of this invention.

With particular reference to the drawing wherein is illustrated a preferred embodiment of the glass block panel of my invention, I show a glass block panel formed from four glass blocks. It should be understood that the glass block panels embodying my invention may be any rectangular shape and composed of any number of glass blocks. The illustration in the drawing showing four glass blocks arranged as a square panel is solely for the purpose of describing this invention.

Figure 4:
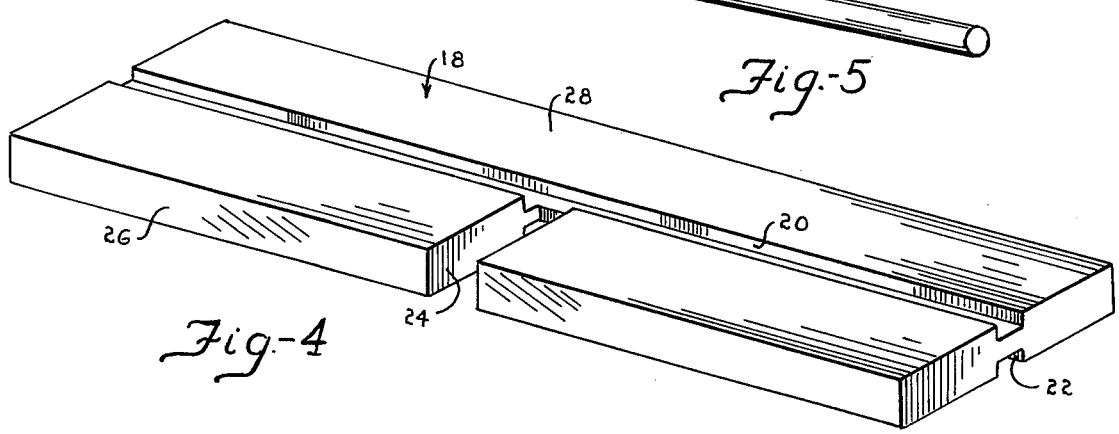
FIG. 4 is a pictorial view of the glass block spacer member of this invention.

The glass block panel of my invention is designated generally by the numeral 10. It comprises a plurality of glass blocks 12 having an upstanding rib 14 circumscribing the edges 16 thereof. I provide a plurality of elongated spacer members 18 formed from plastic or wood material or the like having a length dimension equal to multiples of glass blocks 12 that make up the width and breadth of panel 10. As best shown in FIG. 4, each spacer member 18 is formed with central longitudinal grooves 20 and 22 in opposite faces of member 18 and lateral slots 24 extending from the edge 26 thereof to longitudinal notches 20 and 22. The width of spacer member 18 is dimensioned to provide mortar recesses 30 and 32 between longitudinal edges 26 and 28 of spacer member 18 and opposite faces 34 and 36, respectively, of glass block panel 10. Filler bars 38 are provided as longitudinal spacers between longitudinal edges 26 and 28 of members 18, and silicone caulking material 40 placed in mortar recesses 30 and 32 to serve as the mortar-like joint of the glass block panel.

As an article of manufacture, glass block panel 10 of my invention comprises a plurality of glass blocks 12 uniformly spaced apart edge to edge in a width and breadth direction by longitudinal spacer members 18 which receive in the longitudinal grooves 20 and 22 therein the circumferential rib 14 of glass blocks 12. The longitudinal spacer members 18 are interconnected together by cross fitting the solid longitudinal half of one spacer member 18 into the slotted opening 24 of another spacer member 18 in perpendicular relationship to form a reticular frame holding the plurality of glass blocks 12 as a rectangular panel 10 as shown in FIG. 1. Longitudinal filler or spacer bar members 38 preferably made from material such as Styrofoam or the like are fitted in recesses 30 and 32 formed by laterally recessed longitudinal sides 26 and 28 of spacer members 18 and faces 34 and 36 of glass blocks 12. Spacer members 38 are radially compressible for squeezing into the recesses whereupon the material of spacer members 38 expands to fill the width of recesses 30 and 32 whereby the spacer members 38 are anchored in the recesses. Spacer members 38 partially occupy the mortar recess depth. The balance of mortar recesses are preferably filled with a silicone caulking material 40 which adheres to spacer members 38 to provide a chip resistant mortar-like joint.

The glass block panel 10 is held together by bands 42 tightly circumscribing the edges 16 of the glass blocks 12 on each side of circumferential ribs 14.

The glass block panel 10 of my invention assembled as above described is easy and economical to manufacture, rigid in structure and may be handled without danger of distortion.

I claim:

1. A prefabricated glass block panel comprising: a plurality of glass blocks having an upstanding rib circumferentially around the edge of each of said glass blocks; a plurality of rigid elongated members having a longitudinal center groove in each side thereof, said rigid members laterally spanning the edge of said glass blocks, one longitudinal part of said member being laterally slotted to the center groove thereof, said elongated members being interlocked together in said slotted openings forming a rigid reticular frame between said glass blocks and spacing said glass blocks in a width and breadth direction; and tie means circumferentially around the edge of said glass blocks.

2. The prefabricated glass block panel of claim 1 wherein said upstanding rib of said glass blocks are further characterized as being fitted in said longitudinal grooves of said elongated members.

3. The prefabricated glass block panel of claim 1 wherein said reticular frame formed by said elongated member between said glass blocks is further characterized as being recessed from the faces of said glass blocks for providing mortar spaces.

4. A prefabricated glass block panel comprising: a plurality of glass blocks having an upstanding rib circumferentially around the edge of each said glass blocks; a plurality of rigid elongated members having a longitudinal center groove in the sides thereof, one longitudinal part of said members being laterally slotted to the center groove thereof, said elongated members being interlocked together in said slotted openings forming a reticular frame between said glass blocks and spacing said glass blocks in a width and breadth direction; deformable filler members longitudinally abutting the edge of said rigid elongated members; and tie means circumferentially around the edges of said glass blocks.

5. A prefabricated glass block panel comprising: a plurality of glass blocks having an upstanding rib circumferentially around the edge of each of said glass blocks; a plurality of rigid elongated members having a longitudinal center groove in the sides thereof, one longitudinal part of said members being laterally slotted to the center groove thereof, said elongated members being interlocked together in said slotted openings forming a rigid reticular frame between said glass blocks and spacing said glass blocks in a width and breadth direction; caulking material between said glass blocks and said rigid elongated members; and tie means circumferentially around the edges of said glass blocks.

6. A prefabricated glass block panel comprising: a plurality of glass blocks having an upstanding rib circumferentially around the edge of each of said glass blocks; a plurality of rigid elongated members having a longitudinal center groove in the sides thereof, one longitudinal part of said member being laterally slotted to the center groove thereof, said elongated members being interlocked together in said slotted openings forming a reticular frame between said glass blocks and spacing said glass blocks in a width and breadth direction; elongated, radially deformable filler members longitudinally abutting the edge of said elongated rigid members; caulking material between said glass blocks and said elongated filler members; and tie means circumferentially around the edges of said glass blocks.

* * * * *